United States Patent [19]
Starks

[11] 3,860,451
[45] Jan. 14, 1975

[54] METHOD FOR PREPARING A MAGNETIC SUBSTRATE

[75] Inventor: Charles M. Starks, Ponca City, Okla.

[73] Assignee: Continental Oil Company, Ponca City, Okla.

[22] Filed: Jan. 2, 1973

[21] Appl. No.: 320,427

[52] U.S. Cl. .................... 117/240, 117/62, 117/235
[51] Int. Cl. .................... H01f 10/00
[58] Field of Search .................... 117/235–239, 117/240, 160 R, 62, 130 E

[56] References Cited

UNITED STATES PATENTS

| | | | |
|---|---|---|---|
| 3,042,543 | 7/1962 | Schuele | 117/62 |
| 3,150,995 | 9/1964 | Bauer | 117/235 |
| 3,330,693 | 7/1967 | Rumberger | 117/235 |
| 3,496,014 | 2/1970 | Koretzky et al. | 117/160 X |
| 3,523,875 | 8/1970 | Minklei | 117/160 X |
| 3,524,754 | 8/1970 | Blytas et al. | 117/160 X |

*Primary Examiner*—William D. Martin
*Assistant Examiner*—Bernard D. Pianalto
*Attorney, Agent, or Firm*—Ronnie D. Wilson; Ronald J. Carlson

[57] ABSTRACT

An improved method for preparing a substrate having magnetically sensitive particles on the surface thereof by impregnating the surface with a metal salt or oxide of a magnetically sensitive metal wherein the improvement comprises reducing the metal salt or oxide to metal in situ with an aluminum trialkyl or an alkyl aluminum hydride compound.

1 Claim, No Drawings

METHOD FOR PREPARING A MAGNETIC SUBSTRATE

This invention relates to the preparation of substrates containing particles of iron, cobalt, molybdenum or nickel suitable for use in magnetic recording media.

More particularly, the present invention relates to a method of preparing magnetically sensitive substrates by impregnating the surface of a substrate with a metal salt or oxide of iron, cobalt, molybdenum or nickel and reducing said salt or oxide in situ with an aluminum trialkyl or an alkyl aluminum hydride compound.

In the field of magnetic tapes, to be operational, it is necessary that the magentically-sensitive particles be firmly attached to the substrate and that the particles be physically separated from each other. Presently magnetically-sensitive materials are prepared by utilizing magnetic oxides of iron. It has also been known to impregnate iron oxide particles as well as iron, magnetite or zinc ferrous ferrite particles in a polymeric binder and coat same on a flexible tape to achieve a magnetic recording element. Previously, it has also been provided that magnetic-sensitive particles could be prepared by subjecting the oxide film surface of a metal to a reducing atmosphere in order to convert the oxide film to the metal. As suitable reducing agents alkali metal and alkali earth metal hydrides have been known. Subsequently, these prepared particles are bound to a substrate by various methods to achieve a magnetic sensitive tape. U.S. Pat. Nos. 3,042,543; 3,150,995 and 3,330,693 disclose various ways of binding magnetic particles to substrates to achieve a magnetic tape.

Unfortunately, when magnetic particles are prepared by heating oxide particles to elevated temperatures in the atmosphere of a reducing gas, such as hydrogen, the resulting metallic particles do not possess the magnetic properties desired. Further, this reducing method is difficult to control because of elevated temperatures. Also, with conventional reducing agents such as hydrogen and calcium hydride or the like, the high temperatures necessary to convert metal oxides to their metals are so intense so as to make in situ reduction of metal oxide particles on a substrate such as film or tape impossible because of the film or tape destruction by the heat.

Therefore, it is an object of the present invention to provide the art with an improved method of preparing magnetic tapes.

A further object of the present invention is to provide the art with an improved method of converting metal oxidic particles to their metallic particles of increased magnetic sensitivity.

Another object of the present invention is the provision of an improved method of converting metal oxidic particles impregnated on a substrate to their metallic particles of increased magnetic sensitivity.

These and other objects of the present invention will become apparent from a reading of the following description.

It has now been found that the objects of the present invention can be attained in a method of converting metal oxide particles to their metals in the presence of a reducing atmopshere, by treating said metal oxide particles with an aluminum alkyl or hydride to thereby achieve metallic particles of high magnetic susceptibility.

In the operation of the improved method for preparing magnetic particles and impregnating said magnetic particles on a substrate suitable as magnetic tapes, metal salts of iron, nickel, cobalt or molybdenum may be employed as the particles for conversion. These metal salts include the halides, acetonylacetates, napthenates and carboxylates of iron, nickel, cobalt and molybdenum.

Further, it has been found that magnetic metal oxides already attached to substrate materials are converted to their zero-valent metals by treatment with an aluminum alkyl or hydride. Therefore, presently manufactured magnetic tapes having iron oxide particles thereon can be treated with aluminum alkyls or hydrides so as to reduce the iron oxide to metallic iron, thereby obtaining a tape of high magnetic susceptibility.

It has also been discovered that treating a solution of one or more of the above-identified metal salts or oxides and a suitable polymer nonreactive with the aluminum compound (such as polyethylene, polypropylene, polystyrene, polyvinyl chloride, polyvinyl pyridine, poly methyl vinyl ether and the like) with an aluminum alkyl or hydride and a precipitating agent nonreactive with the aluminum compound (such as butane, hexane, heptane and the like) results in a precipitated metal encapsulated within said polymer suitable for coating on a flexible substrate to achieve a magnetic tape of higher magnetic susceptibility than previously realized.

Suitable aluminum alkyls and hydrides for practicing the present invention include diethyl aluminum hydride, diisobutyl aluminum hydride, triethyl aluminum, trimethyl aluminum, triisobutyl aluminum, trialkyl aluminum wherein the alkyl group = $C_2$–$C_{20}$. Preferably, excellent results may be achieved using aluminum triethyl and diethyl aluminum hydride.

In order to reduce the metal salts or oxides of the present invention to their respective metals any amount of aluminum alkyl and/or hydride will result in obtaining some reduced metal particles. However, the temperature of the solution or the surrounding environment and the type of polymer employed all contribute to effect the results achievable. As a practical matter, in order to perform the present invention in a reasonable length of time of only a few seconds more than one mole of aluminum compound should be utilized per mole of metal present so as to work within a temperature range of 0°–100°C. The exact desired conditions to achieve maximum efficiency for a given operation will vary according to aluminum compound and type of polymer employed. Any excess aluminum compound which is employed over the preferable 3 moles of aluminum compound per mole of metal can easily be drained off and recycled for further reuse in the operation.

The present invention can be better understood by referring to the following examples of its practice. Experimental runs were performed to illustrate the practice of the method of the present invention.

EXAMPLE 1

A strip of cotton cloth was soaked for 24 hours in a solution of 51.6 g. $FeCl_3$ in 150 ml of water. The resulting brown strip was dried in a vacuum oven at 50°C. After drying the strip in an inert atmosphere, it was dipped into a solution of 25% diethylaluminum hydride, 21% aluminum triethyl and 54% naphtha solvent. After 5 minutes, the strip was removed from the solution and excess alkyl solution was allowed to drain. The cloth was then successively washed with water, 5% NaOH solution and then with hot water to remove the aluminum compounds. After drying, the cloth strip was grey, due to the presence of small iron particles on the cloth (as observed under the microscope).

EXAMPLE 2

A solution of 20 ml of 1 wt. % nickel acetonylacetate, in tetrahydrofuran solution was mixed with 250 ml of a 2% solution of polyvinyl chloride in tetrahydrofuran. Diethylaluminum hydride solution (10 ml of 5 wt. % ADEH) in tetrahydrofuran was added. The addition caused the immediate formation of colloidal nickel. The reaction mixture was then poured into 300 ml of isopropanol. The polymer which precipitated was filtered and washed with water. Examination of a sample of the polymer under the microscope showed that nickel particles were uniformly distributed throughout the polymer.

Although certain specific embodiments of the invention have been described as exemplary of its practice the examples are not intended to limit the invention in any way. Other process parameters and materials may be used in accordance with the broad principles outlined herein and when so used are deemed to be circumscribed by the spirit and scope of the invention except as necessarily limited by the appended claims or reasonable equivalents thereof.

Therefore, I claim:

1. In a method for preparing a flexible substrate having magnetically sensitive particles on the surface thereof by impregnating the surface with a salt or oxide of iron and thereafter reducing said salt or oxide in situ to magnetic iron, the improvement which comprises carrying out the reduction of said salt or oxide with aluminum triethyl, diethyl aluminum hydride or mixture thereof.

* * * * *